March 1, 1938. L. K. DAVIS 2,109,837

METHOD OF JOINING POWER TRANSMITTING CABLES

Filed Jan. 2, 1936

INVENTOR
Lewis K. Davis
BY Morgan, Finnegan & Durham
ATTORNEYS

Patented Mar. 1, 1938

2,109,837

UNITED STATES PATENT OFFICE 2,109,837

METHOD OF JOINING POWER TRANSMITTING CABLES

Lewis K. Davis, Hampton, N. J., assignor to Grace P. Davis, Hampton, N. J.

Application January 2, 1936, Serial No. 57,233

7 Claims. (Cl. 29—148)

The invention relates to new and useful improvements in power transmitting cables and the like, more especially to a novel union or juncture for such cables and a method of producing same.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawing, referred to herein and constituting a part hereof, illustrates one embodiment of the invention, and together with the description, serves to explain the principles of the invention.

Of the drawing:—

Objects of the invention are to provide a novel, very compact and very strong union or juncture of two stranded metallic cables (that is, a cable consisting of a plurality of twisted together wires), such as are used for power-transmitting lines and other purposes as well. Objects of the invention are to provide a simple and strong union, adequate to sustain all strains put upon it without disruption or dislocation, which has few parts, which may be simply, readily and quickly made in the field and which requires little mechanism or apparatus for effecting the union. The cylindrical and separate twisted wires or strands of the cable are crushed together so as to be deformed and brought permanently into fast contact with each other throughout their entire peripheries making in effect a homogeneous weld of the entire cable. This is done by enclosing the abutting cable ends in a sleeve of ductile but strong metal, such as copper and then decreasing the area within the sleeve by pressure so that the cable strands or wires are welded with the sleeve as well as with each other.

Figure 1:
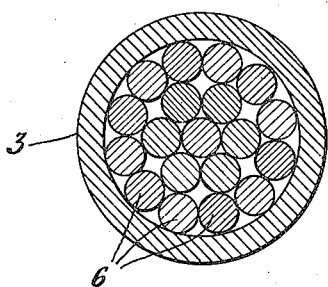
Fig. 1 is a section through the union before compression.

Referring now in detail to the present preferred embodiment and the present particular steps employed in the method, the ends of two cables 1 and 2 are abutted within a cylindrical sleeve 3, which sleeve is of sufficient length to enclose the abutted cable ends for some distance, the particular length in each case being readily determinable, dependent upon the size of the cables and the mechanical strain, dead and alive, that may be put upon them. It is possible to make the joints sufficiently strong so that under breaking strain, the break will occur in the cable outside of the sleeve. The strands 6 of the cables are usually of copper coated with tin, and the sleeve 3 may likewise be of copper, and the sleeve will fit the strand snugly as shown in Fig. 1.

In one manner of carrying out the method, the sleeve 3 with the two cable ends abutted within the central part thereof, is placed in a support, shown as two members 9 and 10, centrally cylindrically recessed so as to fit snugly about the sleeve 3. In the member or block 10 is a plunger 11, having its inner end preferably rounded, the plunger extending longitudinally along the periphery of the sleeve 3. Heavy pressure, generally of the order of tens of thousands of pounds to the square inch is applied to the plunger 11, and the periphery of the sleeve 3 just beneath the plunger is forced powerfully inwardly, as shown at 12, while the remainder of the sleeve is supported against deformation. As a result, the area within the sleeve is greatly and powerfully contracted, and the cable strands are crushed together and deformed so that they are in contact, and in effect welded together throughout practically their entire peripheries, and the strands and the sleeve to a very great extent are formed into a solid metallic mass, having very great structural strength. Not only is the joint very simple and strong, but it will be seen that the joints can be made very quickly, very simply and with a minimum of tools or mechanisms, and may be made in the field by only one or two workmen.

Figure 2:
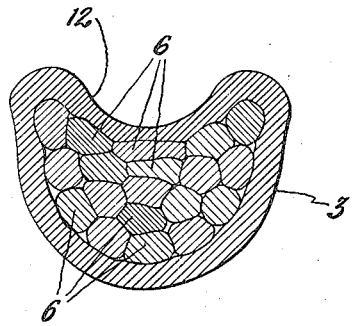
Fig. 2 is a like view after compression and showing the cable strands and sleeve united into a solid mass.
Figure 3:
Fig. 3 is a plan view showing the union after the compression.
Figure 4:
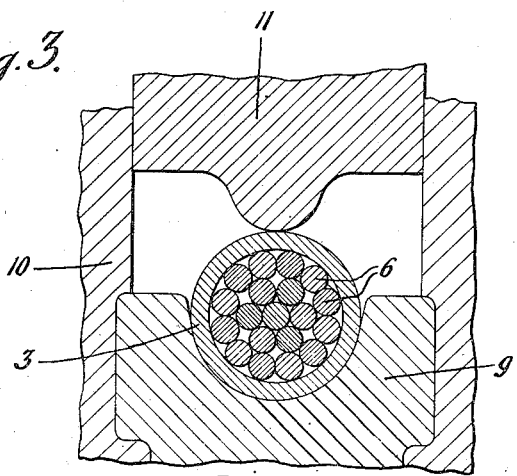
Fig. 4 shows one step in forming the union.

Referring particularly to Fig. 3 it will be seen that the contraction of the sleeve upon the cable therein is largely effected by a bending and stretching of the sleeve, as distinguished from the compression swaging and inward flowing of the metal of the sleeve as practiced hitherto. The periphery of the sleeve is actually elongated while due to the formation of the re-entrant groove or recess, clearly seen in Fig. 2, the cross sectional area is materially reduced. It has been found that the use of this method of deforming the sleeve requires less power and produces bands which are mechanically and electrically superior to the bands produced by the use of counterpart dies or devices which merely flatten one part of the sleeve.

Figure 6:
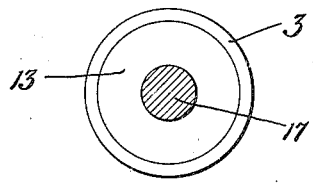
Fig. 6 is a section on line 6—6 of Fig. 5.
Figure 5:
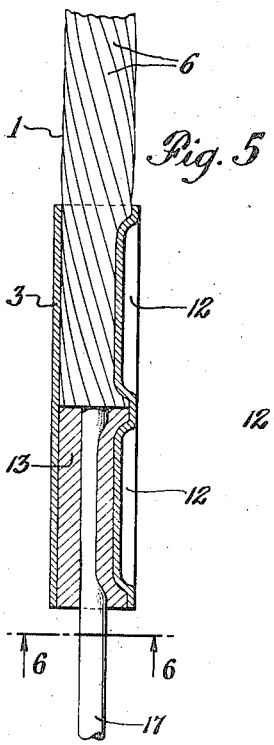
Fig. 5 is a partially sectional view of a cable juncture.

In Figs. 5 and 6 the invention is shown in a present preferred form as applied to uniting cables of different diameters. In said exemplified form the difference in diameter of the abutting cables is provided for by employing a sleeve or bushing 13 between the small diameter cable 17 and the sleeve 3, the sleeve 13 fitting tightly about cable 17 and also fitting closely within the interior of sleeve 3. This bushing 13 is likewise of a strong, ductile metal and preferably of the same metal as the sleeve 3. A single sleeve member having its interior opening of two different diameters may be employed if desired. The uniting operation is substantially the same as already described, and in the exemplification of Fig. 5 two deformation areas 12 are shown, one on the large diameter cable 6, and the other on the small diameter cable 17. This procedure will be usually more efficient, as the pressure exerted on these two parts may be varied as found necessary or desirable to get the best results in uniting the different size cables, although a single deformed area 12 may be created to extend over both cable ends if desired.

The invention in its broader aspects is not limited to the specific mechanisms shown and described, but departures may be made therefrom within the scope of the accompanying claims without departing from the principles of the invention and without sacrificing its chief advantages.

What I claim is:

1. The method of uniting stranded power cables and the like which comprises abutting two cable ends within a metal sleeve, supporting the sleeve about the greater part of its periphery, and forcing a portion only of the unsupported part of the sleeve inwardly to compress and deform the strands to form the strands and contracted sleeve into a solid metallic mass.

2. The method of uniting stranded power cables and the like which comprises abutting two cable ends within a metal sleeve, supporting the sleeve about the greater part of its periphery, and forcing a portion only of the unsupported part of the sleeve inwardly along the length of the sleeve to compress and deform the strands to form the strands and contracted sleeve into a solid metallic mass.

3. The method of uniting stranded power cables and the like of different diameters which comprises abutting two cable ends within a device made of strong, ductile metal and having varying internal diameters to fit snugly about the two cable ends, supporting said device about the greater part of its periphery, and forcing a portion only of the unsupported part of the device inwardly along its length to compress and deform the cable strand to make the strand and deformed device into a solid metallic mass.

4. The method of uniting stranded power cables and the like which comprises abutting two cable ends within a metal sleeve, supporting the outward periphery of said sleeve through a portion of its circumference and inwardly powerfully deforming another part of said circumference to decrease the cross-sectional area within said sleeve and crush and deform the strands into a substantially solid mass.

5. The method of joining stranded cables and the like which comprises inserting the ends of the cables to be joined in a sleeve of ductile metal, supporting substantially one half of said sleeve in a die of a size and configuration conforming to the exterior periphery of said sleeve and while thus assembled and supported forcing radially inwardly a longitudinal portion of said sleeve of limited transverse dimensions, whereby the exterior periphery of said sleeve is elongated while its cross sectional area is diminished.

6. The method of joining stranded cables and the like which comprises inserting the ends of the cables to be joined in a sleeve of ductile metal, supporting substantially one half of said sleeve in a die of a size and configuration conforming to the exterior periphery of said sleeve and while thus assembled and supported forming in the unsupported portion of said sleeve a longitudinally extending re-entrant groove by forcefully applying thereto a tool provided with a longitudinally disposed transversely convex sleeve engaging projection.

7. In the joining of cables and the like by affixing a sleeve of ductile metal to the members to be joined, the method which comprises assembling the cable ends within said sleeve, supporting substantially half the cross section of said sleeve in a die having a configuration conforming to the exterior periphery of said sleeve, and elongating the exterior periphery of said sleeve while reducing its cross sectional area by forming in the unsupported portion thereof a substantially radially disposed and longitudinally extending groove.

LEWIS K. DAVIS.